US012723914B2

(12) United States Patent
Junker et al.

(10) Patent No.: US 12,723,914 B2
(45) Date of Patent: Sep. 1, 2026

(54) VARIABLE TRANSMISSION APERTURE

(71) Applicant: Agilent Technologies, Inc., Santa Clara, CA (US)

(72) Inventors: Mark Junker, North Melbourne (AU); Philip Wilson, Mount Waverly (AU)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 784 days.

(21) Appl. No.: 17/763,537

(22) PCT Filed: Aug. 19, 2020

(86) PCT No.: PCT/IB2020/057785
§ 371 (c)(1),
(2) Date: Mar. 24, 2022

(87) PCT Pub. No.: WO2021/059044
PCT Pub. Date: Apr. 1, 2021

(65) Prior Publication Data

US 2022/0349750 A1 Nov. 3, 2022

(30) Foreign Application Priority Data

Sep. 24, 2019 (AU) ................................ 2019903559

(51) Int. Cl.
*G01J 3/02* (2006.01)
*G01J 3/443* (2006.01)
*G01N 21/73* (2006.01)

(52) U.S. Cl.
CPC ........... *G01J 3/0208* (2013.01); *G01J 3/0229* (2013.01); *G01J 3/443* (2013.01); *G01N 21/73* (2013.01)

(58) Field of Classification Search
CPC ........ G01J 3/0208; G01J 3/0229; G01J 3/443; G01J 3/0237; G01J 3/4406; G01J 3/42; G01N 21/73
(Continued)

(56) References Cited

U.S. PATENT DOCUMENTS 5,776,541 A * 7/1998 Belt ...................... B05D 5/061 427/199
5,859,424 A 1/1999 Norton et al.
(Continued)

FOREIGN PATENT DOCUMENTS

CN 102540473 A 7/2012
CN 106338341 A 1/2017

OTHER PUBLICATIONS

Pseudo Random, Netwon's Telecom Dictionary 666 (2004).*
(Continued)

*Primary Examiner* — Isiaka O Akanbi
(74) *Attorney, Agent, or Firm* — Lando & Anastasi, LLP

(57) ABSTRACT

A spectrometry system for spectroscopically analyzing a sample is provided. The system includes an excitation source for interacting with the sample; a detector for detecting at least a portion of light absorbed or emitted by the sample, the excitation source and detector being optically coupled via an optical pathway; and an aperture positioned in the optical pathway for limiting transmission of light from the excitation source to the detector; wherein the aperture is configured to have a spatially varying distribution of one or more geometric features that provide regions of variable transmission around an edge of the aperture. Also provided is a mask for use with a spectrometry system, the mask configured to be positioned in an optical pathway between an excitation source and a detector, wherein the mask has a spatially varying distribution of one or more geometric features that provide regions of variable transmission around (Continued)

110 120 100 130 140 150 160 an edge of the aperture. A method for limiting light throughput from an excitation source to a detector via an aperture in a spectrometry system is also provided.

10 Claims, 7 Drawing Sheets

(58) Field of Classification Search
USPC .......................................................... 356/310
See application file for complete search history.

(56) References Cited

U.S. PATENT DOCUMENTS 6,747,280 B1 * 6/2004 Weiss ..................... G02B 21/16 250/459.1
6,963,399 B2 * 11/2005 Cargill ................... G01N 21/31 356/300
7,651,283 B2 * 1/2010 Saito .................. G02B 27/0018 396/507
2006/0094108 A1 5/2006 Yoder et al.
2007/0035852 A1 * 2/2007 Farr ..................... G02B 27/147 359/738
2007/0154207 A1 7/2007 Saito et al.
2007/0291266 A1 * 12/2007 Handa ....................... G01J 3/20 356/328
2009/0185065 A1 7/2009 Ohno et al.
2013/0306880 A1 * 11/2013 Yamano ................... G03B 9/02 362/293
2014/0002820 A1 1/2014 Ko
2014/0016125 A1 * 1/2014 Sullivan ................. G02B 27/58 359/227
2015/0309225 A1 * 10/2015 Moore ..................... G02B 5/22 359/885
2016/0154248 A1 6/2016 Lee
2017/0010157 A1 1/2017 Minato
2020/0196427 A1 * 6/2020 Ina ........................ H05H 1/0037
2021/0372784 A1 * 12/2021 Hill ...................... G01B 11/272

OTHER PUBLICATIONS

PCT, "Notification of Transmittal of The International Search Report & Written Opinion mailed on Sep. 29, 2020," Application No. PCT/IB2020/057785, 11 pages.
Soskind, Yakov G. et al., "Field Guide to Diffractive Optics, Apodized Apertures," pp. 19-23, vol. FG21, 2011, 5 pages.
"Third Party Observations for PCT/IB2020/057785," dated Nov. 24, 2021, 3 pages.
EPO, "Extended European Search Report Received mailed on Oct. 4, 2023," Application No. 20869597.3, 12 pages.
Larson, G. F. et al., "Ultratrace Analyses by Optical Emission Spectroscopy: The Stray Light Problem," Applied Spectroscopy, vol. 30, No. 4, XP093085236, US ISSN: 0003-7028, DOI: 10.1366/000370276774456994, Jul. 1, 1976, 384-391.
European Office Action from corresponding European Application No. 20869597.3 dated Dec. 12, 2025.

* cited by examiner 400
450
460
440
460
410
215
460
430
460
460
420

VARIABLE TRANSMISSION APERTURE

RELATED APPLICATION(S)

This application is a US national stage entry of PCT/IB2020/057785 filed on 19 Aug. 2020, which claims priority from Australian Application No. 2019903559 filed on 24 Sep. 2019, the contents of which are to be taken as incorporated herein by this reference.

TECHNICAL FIELD

This invention relates to improvements in an apparatus for spectroscopically analyzing a sample including components for achieving such improvements. More specifically, the invention relates to an improved aperture or mask for an aperture for use in an optical spectrometer.

BACKGROUND OF INVENTION

Spectrometry techniques are used to identify the presence of a target chemical species or analyte, in a sample. Some spectrometry techniques rely on the interaction of the analyte with an excitation source such as light, either in the visible spectrum or at wavelengths that cannot be seen. Depending on the specific spectrometry technique employed, the spectra collected may show the intensity of light absorbed or emitted by a sample after a beam of light interacts with the sample.

In other spectrometry techniques, the excitation source is a plasma source, usually made from argon gas, which provides plasma energy to a nebulised sample causing constituent atoms to be excited and emit light. The emitted light is directed into the spectrometer via the entrance slit or aperture which limits the amount of light entering the system. An optical device disperses light that enters the system to isolate different wavelengths of the emitted spectrum. A detector records multiple wavelength ranges simultaneously to capture the emissions from multiple elements at different parts of the emission spectrum. Peaks or troughs in the spectral profile of the detected light are indicative of the presence particular chemical species in the sample. In some spectrometry techniques, quantities or relative amounts of each chemical species can therefore be derived from the spectra.

Noisy data caused by insufficient amounts of light absorbed or emitted by the sample being collected by the spectrometer, or artefacts caused by the spectrometry system itself, may cause the resulting spectra to yield no useful data, or to lead to inconclusive results.

One source of such artefacts is the aperture, which is an essential component of a spectrometry system. Conventionally, apertures have a simple geometric shape that is either circular, straight-edged or a combination of the two, forming an opening through which light enters the spectrometer. Generally, the aperture will be configured to maximise the amount of light that enters the system. However, it is difficult to control the amount of light entering the system with a high degree of accuracy, since the amount of light passing through the aperture is dependent not only on the size, shape and position of the aperture, but is also subject to light being diffracted from the edges of the aperture.

Diffraction of light from the edges of the aperture causes concentrations of light distribution to occur outside of the spot geometrically defined for a particular system by design. For instance, in the case of a circular aperture, diffraction effects can cause an "Airy disk" surrounded by an "Airy pattern", i.e. concentric light and dark rings, to form in the central region. In the case of an aperture having straight edges, the diffraction effect results can cause a streak of light appearing perpendicular to the edge of the aperture. Diffraction from the edges of the aperture causes optical artefacts to form in the detected spectra such that an accurate representation of the sample cannot be achieved.

The detector is typically an integrated array of photosensitive elements that collects the light passing through the spectrometry system. The spatial separation of the individual spectra on the array detector is used to discriminate different wavelengths of light absorbed or emitted by the sample. In this context, artefacts caused by diffracted light, which tend to be highly variable, may be erroneously interpreted as one or more additional wavelengths in the resulting spectrum, thereby complicating the spectral analysis and leading to incorrect determination of the sample composition.

It would be desirable to have greater control over how light is diffracted by the aperture in order to be able to ameliorate the resulting artefacts and improve the accuracy of representation of the illuminated sample.

A reference herein to a patent document or other matter which is given as prior art is not to be taken as an admission that that document or matter was, in Australia, known or that the information it contains was part of the common general knowledge as at the priority date established by the present application.

SUMMARY OF INVENTION

According to an aspect of the present invention, there is provided a spectrometry system for spectroscopically analyzing a sample, the system including an excitation source for interacting with the sample; a detector for detecting at least a portion of light absorbed or emitted by the sample, the excitation source and detector being optically coupled via an optical pathway; and an aperture positioned in the optical pathway for limiting transmission of light from the excitation source to the detector; wherein the aperture is configured to have a spatially varying distribution of one or more geometric features that provide regions of variable transmission around an edge of the aperture.

Regions having variable transmission around the edge of the aperture may constitute such regions having either zero transmission or full transmission. Zero transmission occurs when a geometric feature of the aperture physically blocks the transmission of light and full transmission occurs when no geometric feature of the aperture physically blocks the transmission of light.

In certain embodiments, the geometric features providing variable transmission around the edge of the aperture include more than one curved edge or spline joined to form a continuous edge. That is, rather than a standard rectangular or circular aperture, the aperture comprises a plurality of curved edges joined together with more curved and/or straight edges to form an aperture having an irregular shape.

In other embodiments, the geometric features providing variable transmission around the edge of the aperture comprise serrations provided on at least a portion of the edge of the aperture. The serrations may be formed on the edge of an aperture having a regular rectangular or circular shape, or more preferably are formed on the edge of an aperture having more than one curved edge joined to form a continuous edge as described above.

The geometric features may be randomly spatially distributed around at least a portion of the edge of the aperture and preferably around the entire edge of the aperture. In some embodiments, the geometric features are arranged to be pseudo-random in their distribution around the edge of the aperture.

According to certain embodiments, the variable transmission aperture is formed by generating a base mask, wherein each of one or more edges of the base mask are defined by a plurality of base mask points and the position of one or more points is randomly varied around the edge of the aperture to form geometric features providing variable transmission around the edge of the aperture.

Randomly varying the position of one or more base mask points to form geometric features providing variable transmission around the edge of the aperture may involve varying the position of at least some of the base mask points with respect to a position of an adjacent base point mask along the edge of the aperture; and/or varying a lateral displacement of at least some of the base mask points relative to the edge of the base mask. That is, the spatial distribution of the regions of variable transmission, i.e. zero transmission or full transmission, is randomly distributed around the edge of the aperture.

In some particular embodiments, the excitation source is a plasma source for dissociating and exciting the sample. More specifically, the spectrometry system may be an inductively coupled plasma optical emission spectrometer (ICP-OES) instrument.

According to another aspect of the present invention, there is provided a mask for a spectrometry system for analyzing a sample, the mask configured to be positioned in an optical pathway between an excitation source and a detector for detecting at least a portion of light absorbed or emitted by a sample with which the excitation source interacts during use to limit light throughput via an aperture, wherein the mask is configured to have a spatially varying distribution of one or more geometric features that provide regions of variable transmission around an edge of the aperture. That is, a mask is provided according to the present invention which may be retrofit to an existing spectrometry system to confer the recognised advantages.

Regions having variable transmission around the edge of the aperture may constitute such regions having either zero transmission or full transmission. Zero transmission occurs when a geometric feature of the aperture physically blocks the transmission of light and full transmission occurs when no geometric feature of the aperture physically blocks the transmission of light.

In certain embodiments, the geometric features providing variable transmission around the edge of the mask includes more than one curved edge or spline joined to form a continuous edge. That is, rather than a standard rectangular or circular mask, the mask comprises a plurality of curved edges joined together with more curved and/or straight edges to form a mask having an irregular shape.

In other embodiments, the geometric features providing variable transmission around the edge of the mask include serrations provided on at least a portion of the edge of the mask. The serrations may be formed on the edge of a mask having a regular rectangular or circular shape, or more preferably are formed on the edge of an aperture having more than one curved edge joined to form a continuous edge as previously described.

The geometric features may be randomly spatially distributed around at least a portion of the edge of the mask and preferably around the entire edge of the mask. In some embodiments, the geometric features are arranged to be pseudo-random in their placement around the edge of the mask.

According to certain embodiments, the variable transmission mask is formed by generating a base mask, wherein each of one or more edges of the base mask are defined by a plurality of base mask points and the position of one or more points is randomly varied around the edge of the variable transmission mask to from geometric features providing variable transmission around the edge of the mask.

Randomly varying the position of one or more base mask points to form geometric features providing variable transmission around the edge of the mask may involve varying the position of at least some of the base mask points with respect to a position of an adjacent base point mask along the edge of the variable transmission mask; and/or varying a lateral displacement of at least some of the base mask points relative to the edge of the base mask. That is, the spatial distribution of the geometric features providing variable transmission, i.e. zero transmission or full transmission, is random around the edge of the mask.

According to another aspect of the present invention, there is provided a method for limiting light throughput from an excitation source to a detector via an aperture in a spectrometry system for analyzing a sample, wherein the excitation source and the detector are optically coupled via an optical pathway, the method including the step of placing in the optical pathway a mask configured to provide variable transmission around an edge of the aperture, wherein the mask has serrations on at least a portion of the edge.

Where the terms "comprise", "comprises" and "comprising" are used in the specification (including the claims) they are to be interpreted as specifying the stated features, integers, steps or components, but not precluding the presence of one or more features, integers, steps or components, or group thereof.

BRIEF DESCRIPTION OF DRAWINGS

Embodiments are described in further detail below, by way of example, with reference to the accompanying drawings briefly described below.

DETAILED DESCRIPTION

Figure 1:
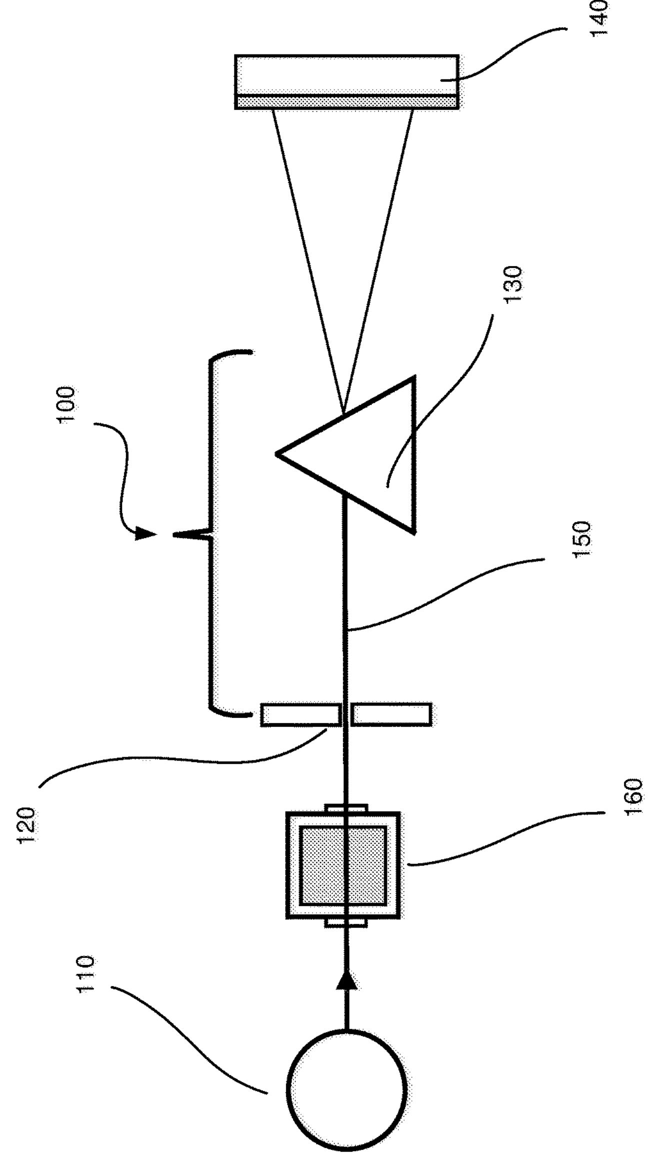
FIG. 1 is a schematic of a generalised spectrometry system according to an embodiment.

Referring firstly to FIG. 1 there is shown generally an optical spectrometer 100 including an excitation source 110 which interacts with a sample in use, an optical element defining an aperture 120, a dispersive optical element 130 and a detector 140. The dispersive optical element 130 is configured to disperse different wavelengths of light, and could comprise, for example, a monochromator or polychromator 200 as shown in more detail in FIG. 2. When light exits the dispersive optical element 130, the light is directed to light detector 140. The excitation source 110 and detector 140 are optically coupled via an optical pathway 150.

In some types of spectrometers, for example, ultraviolet-visible spectroscopy (UV/Vis) or atomic absorption spectroscopy (AAS), a sample 160 is positioned in the optical pathway 150 as generally shown in FIG. 1. The light detector 140 detects the amount of light absorbed or emitted by the sample to enable a determination as to the sample constituents and amounts to be made. Typical light detectors for UV/visible optical spectrometers are photo multipliers, silicon photo diodes and array detectors.

In other types of spectrometers, for example, a plasma emission instrument such as inductively coupled plasma optical emission spectrometer (ICP-OES) or microwave plasma-atomic emission spectrometer (MP-AES), plasma is generated in a plasma torch and the sample in introduced to the plasma in a gas or aerosol form. The sample is dissociated and excited causing the sample constituent atoms to emit light. In an ICP-OES spectrometry system, most commonly, echelle-based optical designs consisting of an echelle grating, a prism and multiple focussing mirrors, are applied to produce the emission spectrum. A polychromator is preferentially used disperse multiple wavelengths of light emitted simultaneously. Solid-state charge transfer devices (CTDs) are the detectors of choice for ICP-OES. Two types of CTDs are commonly used, charge injection devices (CIDs) and charge coupled devices (CCDs).

Figure 2:
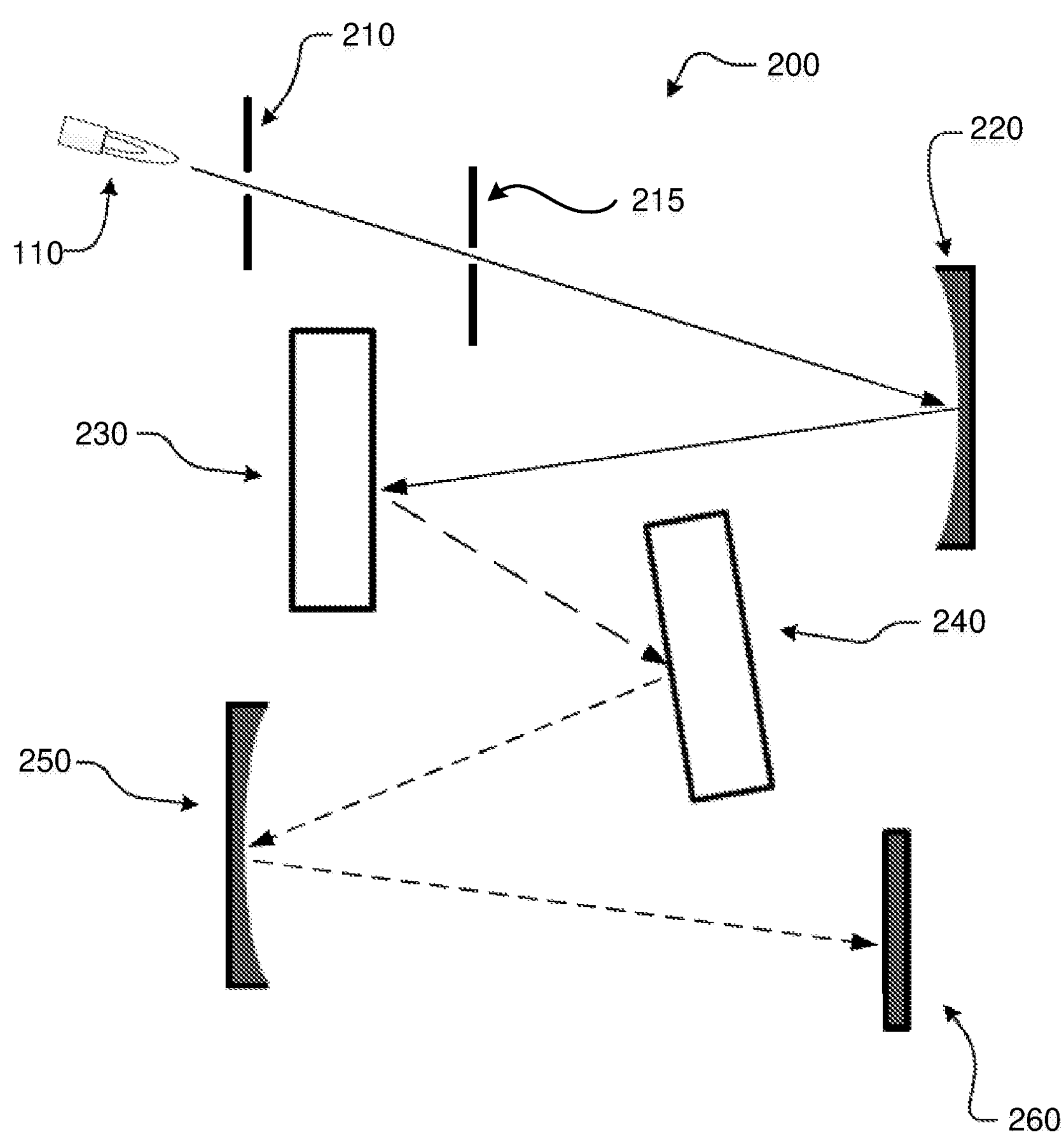
FIG. 2 is a schematic of a polychromator component which may be associated with the spectrometry system of FIG. 1.

Referring now to FIG. 2 there is shown a representative dispersive optical element 130 as shown in FIG. 1 for use in a typical ICP-OES instrument in the form of a polychromator 200. The polychromator 200 comprises optical elements defining an entrance slit 210 and aperture 215. Light emitted by the plasma-excited sample is focussed through the aperture 215 and enters the polychromator. Once light enters the system a collimation mirror 220 focuses the light onto a first dispersive optical element 230 configured to separates the light by wavelength in a single dimension. A second dispersive optical element 240 is configured to disperse the separated light in a second dimension. This produces a two dimensional, high resolution spectrum, which is collected by focus mirror 250 and directed onto light detector 260. The first dispersive optical element 230 and second dispersive optical element 240 may each comprise a prism and diffraction grating, such as an echelle grating, or the like. That is, a two dimensional spectrum can be obtained using two gratings; a grating and a prism; or a prism and a grating, respectively.

In FIG. 2 the aperture 215 is shown and being located inside the polychromator. It will be understood that the aperture 215 may be positioned anywhere inside the polychromator but ideally is located somewhere before dispersive optical elements 230 and 240. In other embodiments, the aperture 215 is located outside the polychromator together with additional focusing optics, such as a pre-optics mirror, or similar.

Figure 3:
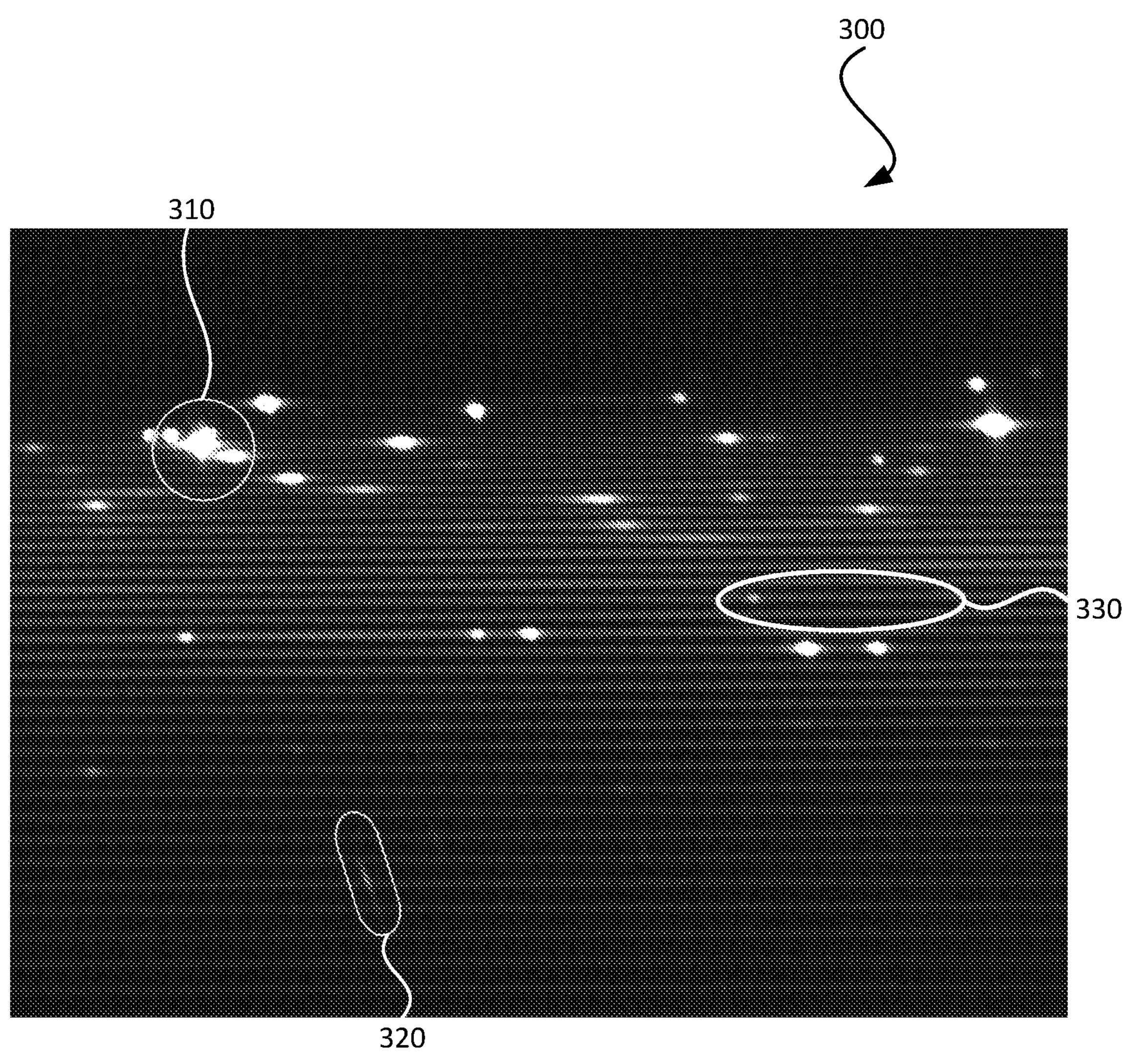
FIG. 3 shows an image of the light pattern from a polychromator taken at the position of the detector.

Referring now to FIG. 3 there is shown an image 300 of the light spectrum produced by the polychromator 200 of an ICP-OES captured by an array detector 140. The image of FIG. 3 was captured using a UV sensitive CCD detector. The top left-hand corner of this image shows an intense spectral emission line including a high intensity object 310. This emission line 310 lacks a clearly defined shape. Vertical and diagonal streaks of light are visible nearby to the high intensity object 310. Lower within the same image and towards its midline, a lower intensity diagonal line 320 can be seen, which represents diffracted light associated with the high intensity object in the top left hand corner of the image. Lower intensity horizontal lines 330 in the same image represent various orders diffracted by the dispersive optical element. The spatial distribution of the emission wavelengths across the array detector is dependent on the polychromator configuration, and more specifically, the specification of the diffraction grating and/or prism, for example.

Prior to the advent of UV sensitive CCD detectors, the light streaking which is observed in FIG. 3 was simply not discernible. That is, whilst it was known that various anomalies may arise in determination of sample composition using spectrometry techniques, it was not understood that these anomalies were the result of random light artefacts caused by factors inherent to the spectrometry system itself. Only since the availability of high resolution imaging means did the inventors come to appreciate that such light artefacts were complicating the spectral analysis. Having recognised this problem, the inventors then set about determining the cause of the artefacts, i.e. which component of the spectrometry system was contributing to this undesirable light flares or streaking.

The inventors subsequently ascertained that light diffracted from the edges of the aperture was a cause of the light artefacts occurring in the detector image. Accordingly, the inventors set about optimising the aperture configuration in order to minimise diffractive effects whilst maintaining sufficient light throughput to the detector and taking in account practical considerations such as manufacturability of the optimised aperture configuration.

The inventors advantageously identified that that by configuring the aperture so as to provide variable transmission around its edge, the diffraction of light from its edges could be minimised, thereby reducing the occurrence of optical artefacts in the detected spectra. More specifically, providing variability in the light transmission around the edges of the aperture results in the distribution of the diffraction effects being more uniform across the detector and consequently, false peak profiles in the spectrum that might otherwise be similar in size to the primary intensity signals will tend to be reduced in amplitude and broadened in width.

The aperture is configured to minimise diffraction from its edges by providing variable transmission around the edge of the aperture. Variable transmission is either zero transmission or full transmission. In binary terms is expressed as zero transmission (0) and full transmission (1) with each of zero transmission and full transmission having a spatially varying distribution around the edge of the aperture. That is, the distribution of regions of zero transmission or full transmission varies spatially from those found in a conventional aperture having a regular rectangular or circular shape in ways which are not predictable.

Variance between zero and full transmission is provided in a number of ways. For instance, it will be understood that zero transmission generally occurs where the light is physically blocked, whilst full transmission occurs where light transmission is unfettered, i.e. no physical light barrier exists. Therefore, one or more geometric features are distributed around the edges in a spatially varying manner. One example of such a geometric feature for providing variable transmission around the edge of the aperture is a series of curved edges or splines. The multiple curved edges may be joined together to form an irregular curved shaped aperture to provide the desired effect of variable light transmission around the edge of the aperture.

An alternative example of such a geometric feature is to provide a series of serrations or tooth-like projections on at least a portion of the aperture edge. The presence of the serrations causes the aperture edge to be jagged rather than smooth in character thereby providing the desired variability in the spatial distribution of regions of zero transmission and full transmission. This in turn has the effect of randomly scattering the diffraction effects so that they are not identified as a single intense false peak or series of intense false peaks which can cause erroneous interpretation of the detected spectrum. Rather a diffuse distribution of the diffraction effects causes them to be normalised in a similar manner to background light.

Each serration physically blocks light transmission whilst spaces between adjacent serrations permit full light transmission. Preferably, the serrations are distributed randomly around at least a portion of the edge of the aperture, i.e. the distribution is not periodic in nature. The spatial variance of regions of full transmission to zero transmission around the edge of the aperture enables a uniform distribution of light diffraction from the edges of the aperture.

Figure 4:
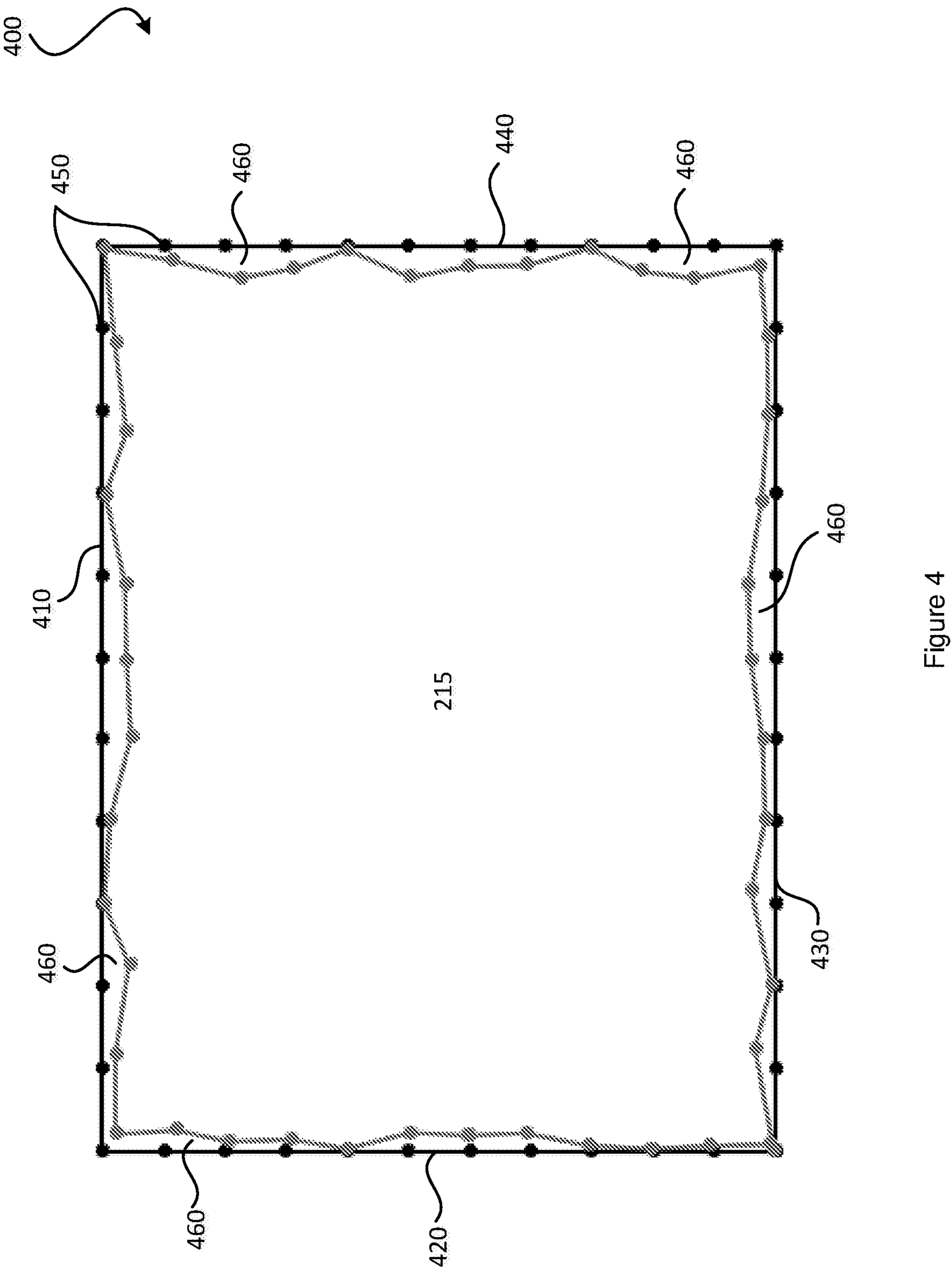
FIG. 4 is a schematic showing how a randomly generated serrated aperture is formed from a base mask according to an embodiment.

In order to produce an aperture or a mask in accordance with an embodiment of the invention, a base mask is generated by defining an equation or a set of equations to define the constraining edge of the aperture. Referring now to FIG. 4, a rectangular base mask 400 can be defined by four equations, each defining the top 410, left 420, bottom 430 or right 440 edge of the mask. In the illustrated example, each of the top, left, bottom or right edges of the base mask represents a straight line, but it will be understood that the edges of the base mask are not necessarily limited to this particular form. As shown in FIG. 4, each edge of the four edges is defined by a series of base points 450. The variability in light transmissions in the form of serrations 460 is defined by randomly varying the spatial distribution of each base mask 450 point along each of the aperture edges. This spatial variance takes the form of separation between base mask points 450 or varying the position of each base mask point with respect to the position of an adjacent base point mask, as well as the extent to which each base mask point is displaced from a nominal straight edge, i.e. a lateral displacement of selected base mask points relative to the nominal straight edge to form the desired geometric features. Preferably, the extent into the aperture 215 (see also FIG. 2) and the arrangement of the serrations 460 around the edge of the aperture is pseudo-random.

The number of base mask points defining the aperture edges and the extent of variance of their spatial distribution from a nominal straight edge is typically constrained by two factors. The first factor is the associated manufacturing costs, and the second factor is the need to avoid adverse impacting light throughput to the spectrometry system. Referring to the first factor, for example, laser cutting which is recognised as one of the primary options for manufacture of the serrated aperture or mask has a limiting resolution of around 25 microns. This limiting resolution accordingly defines a minimum spacing between edge points that is achievable using a specified manufacturing technique. Referring to the second factor, if the serrations which represent regions of zero transmission extend too far from the edge and into the aperture itself, the light throughput of the aperture is reduced. To minimise adverse effects on light throughput, it is preferable to aim for no more than a few percent reduction, and generally less than 5% reduction in light throughout which is realised by ensuring that the maximum extent of the serrations into the aperture is no more than a few percent of the total area of the aperture. In the case of a compact spectrometer, this is understood to provide an upper limit of 1 to 2 millimetres on the dimensions of the serrations.

Figures 5A, 5B, 5C, 6A, 6B, 6C:
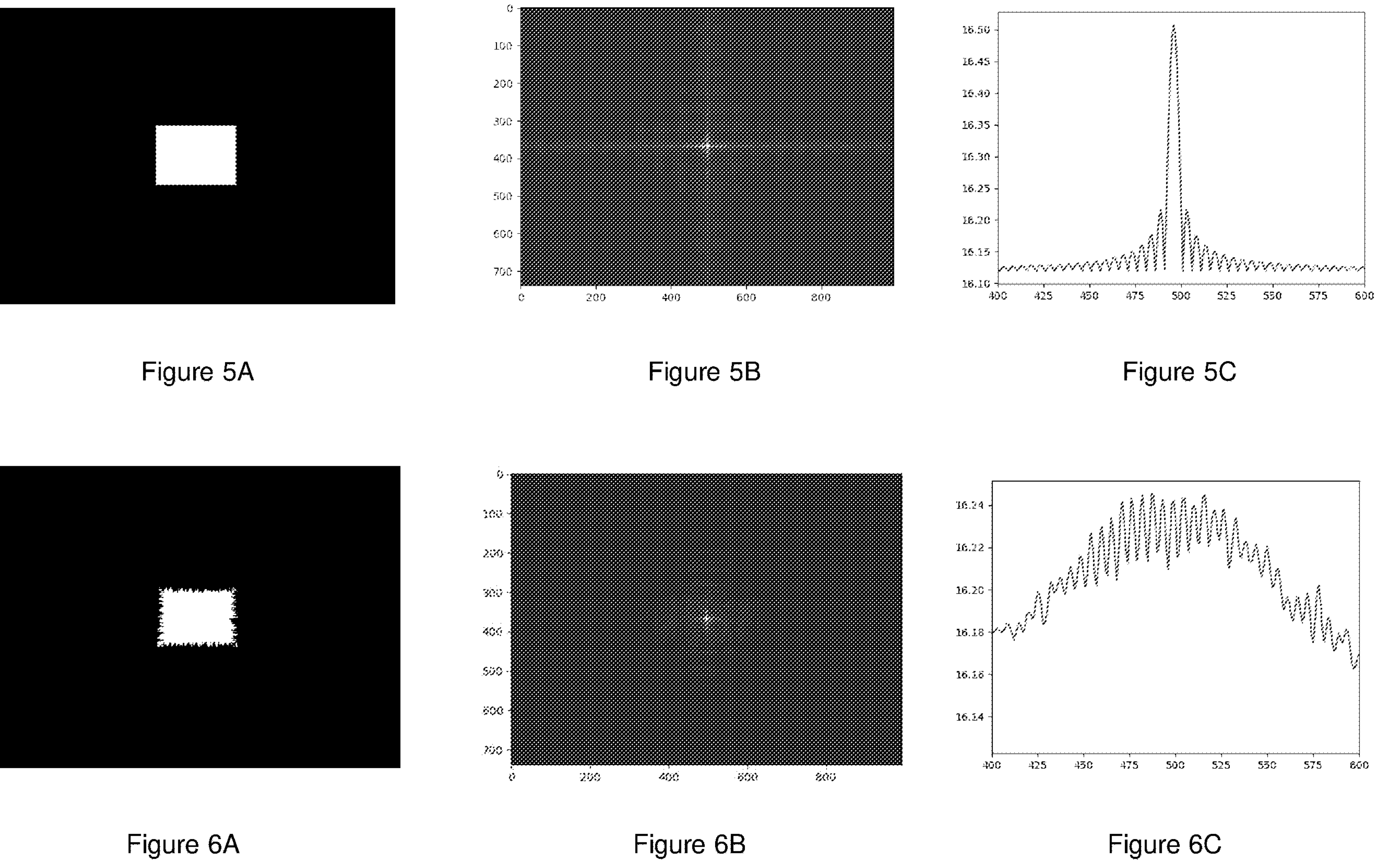
FIGS. 5A to 5C illustrate the effect of a rectangular aperture on a simulated diffraction pattern and the resulting spectra.
FIGS. 6A to 6C illustrate the effect of a modified rectangular aperture as shown in FIG. 5A having serrated edges according to an embodiment on a simulated diffraction pattern and the resulting spectra.

Referring now to FIGS. 5A, 5B and 5C, 6A, 6B and 6C, 7A, 7B and 7C and 8A, 8B and 8C there are shown a variety of aperture or mask shapes together with the associated simulated diffraction patterns and spectral signals. FIGS. 5A, 5B and 5C, for example, show a conventional rectangular aperture and FIG. 5B shows the corresponding simulated diffraction pattern imaged by a CCD detector. The resulting diffraction pattern has intensely illuminated vertical and horizontal light streaks. In FIG. 5C shows the illumination pattern on the middle section (pixels 400 to 600) on a single horizontal row of pixels at row 500. It can be seen that diffraction of light from the edges of the standard rectangular aperture can give rise to a significant aberration such as the intense false peak signal shown in the middle of row 500.

Referring now to FIGS. 6A, 6B and 6C, FIG. 6A shows an aperture modified in accordance with the invention to have randomly distributed serrations around its edge. The corresponding simulated diffraction pattern of FIG. 6B shows significantly reduced diffraction effects when compared to the conventional rectangular aperture of FIG. 5A. Moreover, in FIG. 6C the large peak signal identified at row 500 of FIG. 5C is no longer evident.

Figures 7A, 7B, 7C, 8A, 8B, 8C:
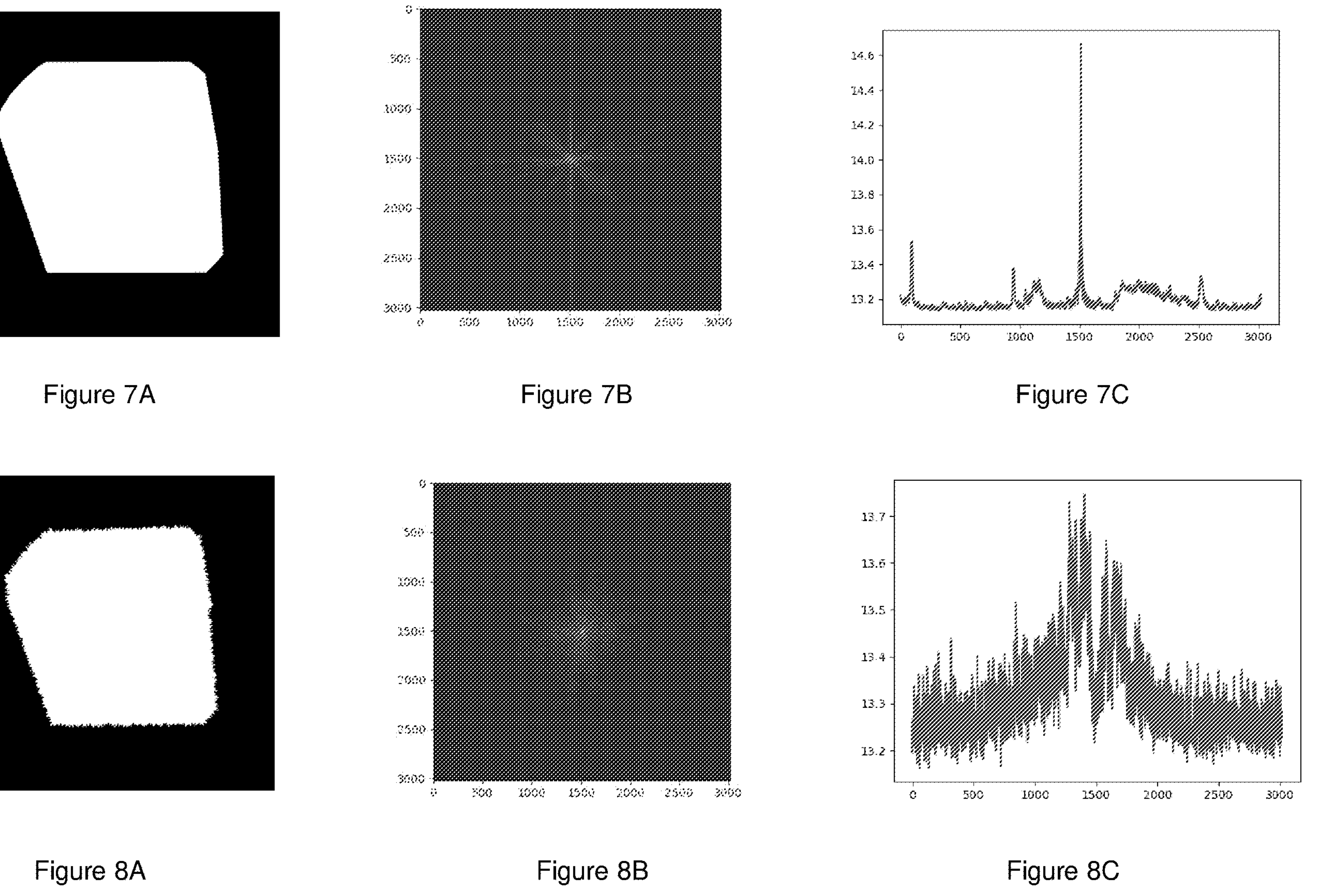
FIGS. 7A to 7C illustrate the effect of a modified aperture having a combination of curved and straight edges on a simulated diffraction pattern and the resulting spectra.
FIGS. 8A to 8C illustrate the effect of the aperture of FIG. 7A modified to have serrations distributed around its edges according to an embodiment on a simulated diffraction pattern and the resulting spectra.

Referring now to FIG. 7A there is shown an aperture having an irregular arrangement of straight and curved edges providing the base mask shape. FIG. 7B is the corresponding simulated diffraction pattern imaged using a CCD detector. This diffraction pattern has an intensely illuminated vertical streak of light along with a less prominent horizontal streak of light and numerous less prominent diagonal streaks of light. Referring to FIG. 7C it will be appreciated that the aperture of FIG. 7A offers a reduction in light artefacts over the conventional rectangular aperture of FIG. 5A. However, the image artefacts of FIG. 7B still various false peaks to be evident on the cross sectional plot being a summation of rows between pixels 2000 and 2500, albeit having reduced intensity.

Comparing the same shaped mask having serrations randomly distributed around its edges as shown in FIG. 8A, shows a more uniform simulated diffraction pattern in FIG. 8B. Plotting the light artefacts of FIG. 8B on a cross sectional plot shows that the false peaks previously seen in FIG. 7C have been substantially eliminated by reducing the false peaks in amplitude and broadening them in width. The large peak signal at pixel 1500 of FIG. 7C is no longer evident, nor are the minor peaks seen close to pixels 0, 1000 and 2500.

Figures 9A, 9B, 10A, 10B, 11A, 11B:
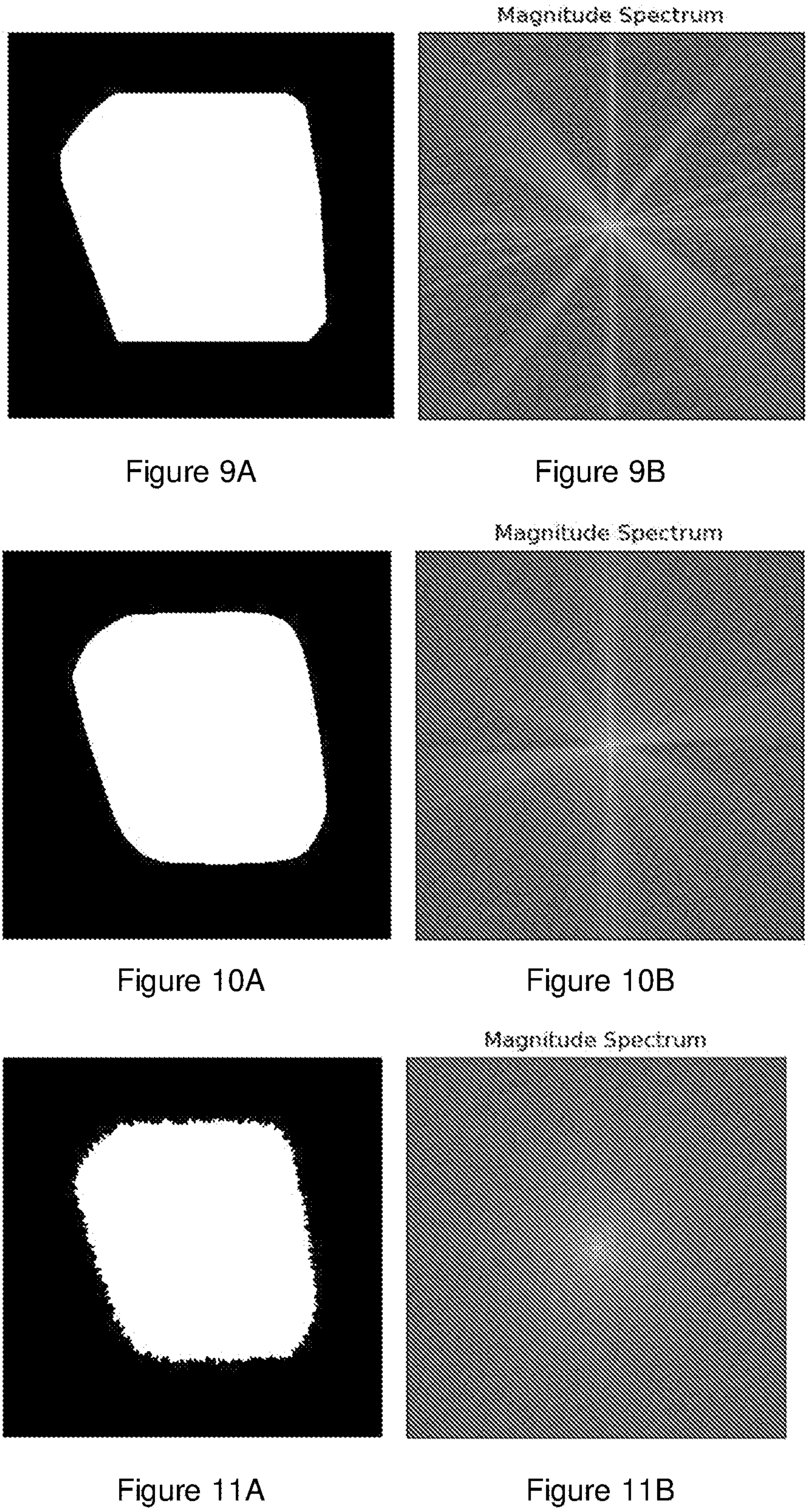
FIG. 9A shows the shape of a base mask or aperture and FIG. 9B shows a corresponding diffraction pattern captured by a detector.
FIG. 10A shows the mask or aperture of FIG. 9A modified by substituting curved lines for straight edges and FIG. 10B shows the corresponding diffraction pattern captured by a detector.
FIG. 11A shows the mask or aperture of FIG. 10A modified to have serrations distributed around its edges and FIG. 11B shows the corresponding diffraction pattern captured by a detector.

Referring now to FIGS. 9A, 9B, 10*a,* 10B, 11A and 11B there is shown how a preferred mask shape is progressively optimised. The original mask shown in FIG. 9A has a basic mask shape having an irregular arrangement of straight and curved edges. The resulting simulated diffraction pattern as imaged using a CCD detector is shown in FIG. 9B. This diffraction pattern has a number of strong, well-defined diffraction lines propagated across the detector which will result in a number of false peaks being identified complicating the spectral analysis. In FIG. 10A, the same basic mask shape has been revised by replacing straight edges with edges having some curvature. Adding a series of curves or splines has the effect of reducing the light streaking effect somewhat as seen in FIG. 10B. Referring now to FIG. 11A, the mask shape of FIG. 10A has been revised further by the addition of serrations to have the effect of significantly reducing the light streaking effects due to edge diffraction seen in FIGS. 9B and 10B.

It will be appreciated that the above examples are exemplary only in the sense that revising a basic mask shape to add curvature and then pseudo-randomly distributed serrations could take many forms which fall within the spirit of the present invention but take different specific forms to those illustrated herein. The mask shapes illustrated in FIGS. 10A and 11A are not unique solutions to the problem being solved, but rather represent two particular compromises between effectively diffusing the diffraction pattern without significantly increasing the complexity of manufacture or limiting the light throughput of the aperture.

In some embodiments, a mask is provided which may be retrofit to an existing spectrometry system. The mask is configured to provide variable transmission between zero transmission and full transmission around an edge of the aperture in the manner previously described. This enables various aperture or mask configurations to be used with a particular optical system and the effect of each modified aperture configuration so be assessed with respect to the impact on the spectral analysis of a sample having a particular composition. This enables an optimal aperture configuration to be determined for the parameters of a particular spectrometry system. It further means that the improvements provided by the present invention can be realised in existing spectrometry systems without the need to costly upgrades.

It is an advantage of the invention disclosed herein to provide means for reducing the adverse effects of light diffraction from the edges of the aperture which was a previously unrecognised problem causing complications and inaccuracies in spectral analysis. The solution propose herein has been demonstrated to be effective in reducing the adverse impacts of such diffraction effects and provides a relatively cheap option that can be implemented by manufacturing and retro-fitting a mask having regions of variable transmission or serrations around at least a portion of its edges.

It will be understood that the solution proposed herein has application in a range of spectrometers including ultraviolet visible (UV/Vis) or atomic absorption spectroscopy (AAS), but has been found to provide particularly beneficial results in microwave plasma-atomic emission spectrometer (MP-AES) or inductively coupled plasma optical emission spectrometer (ICP-OES). Such instruments typically have very low background light with very intense and narrow wavelength peaks. These intense peaks are particularly vulnerable to diffracted light that may spread out to unintended regions of the detector, causing them to be interpreted as peaks at different wavelengths.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A spectrometry system for spectroscopically analyzing a sample, the system comprising:

an excitation source for interacting with the sample;

a detector for detecting at least a portion of light absorbed or emitted by the sample, the excitation source and detector being optically coupled via an optical pathway; and an aperture positioned in the optical pathway for limiting transmission of light from the excitation source to the detector the aperture being configured to have a spatially varying distribution of one or more geometric features that provide regions of variable transmission around an edge of the aperture, the geometric feature spacing being at least one of randomly spatially distributed around at least a portion of the edge of the aperture, b) randomly distributed around the edge of the aperture, or arranged to be pseudo-random, and the geometric feature shape comprising either more than one curved edge joined to form a continuous edge or serrations formed on at least a portion of the edge of the aperture.

2. The spectrometry system according to claim 1, wherein the regions of variable transmission have one of zero transmission or full transmission.

3. The spectrometry system according to claim 1, the aperture formed by generating a base mask with one or more edges defined by a plurality of base mask points and the position of one or more points is randomly varied around the edge of the aperture to form geometric features to provide variable transmission around the edge of the aperture.

4. The spectrometry system according to claim 3, the random variation of the position of one or more base mask points including at least one of varying the positions of at least one of the base mask points with respect to a position of an adjacent base point mask along the edge of the aperture and varying a lateral displacement of at least one of the base mask points relative to the edge of the base mask.

5. The spectrometry system according to claim 1, the excitation source being a plasma source for dissociating and exciting the sample.

6. The spectrometry system according to claim 1, the spectrometry system being an inductively coupled plasma optical emission spectrometer.

7. A mask for a spectrometry system for analyzing a sample, the mask configured to be positioned in an optical pathway between an excitation source and a detector for detecting at least a portion of light absorbed or emitted by a sample with which the excitation source interacts during use to limit light throughput via an aperture and the mask being configured to have a spatially varying distribution of one or more geometric features that provide regions of variable transmission around an edge of the aperture, the geometric feature shape comprising either more than one curved edge joined to form a continuous edge or serrations formed on at least a portion of the edge of the aperture.

8. The mask according to claim 7, wherein the regions of variable transmission have one of zero transmission or full transmission.

9. The mask according to claim 7, the mask formed by generating a base mask having one or more edges defined by a plurality of base mask points, the position of one or more base mask points being randomly varied around the edge to form geometric features to provide variable transmission around the edge of the aperture.

10. The mask according to claim 9, the random variation including at least one of varying the positions of at least some of the base mask points with respect to a position of an adjacent base point mask along the edge of the mask and varying a lateral displacement of at least some of the base mask points relative to the edge of the base mask.

* * * * *